United States Patent Office 2,944,769
Patented July 12, 1960

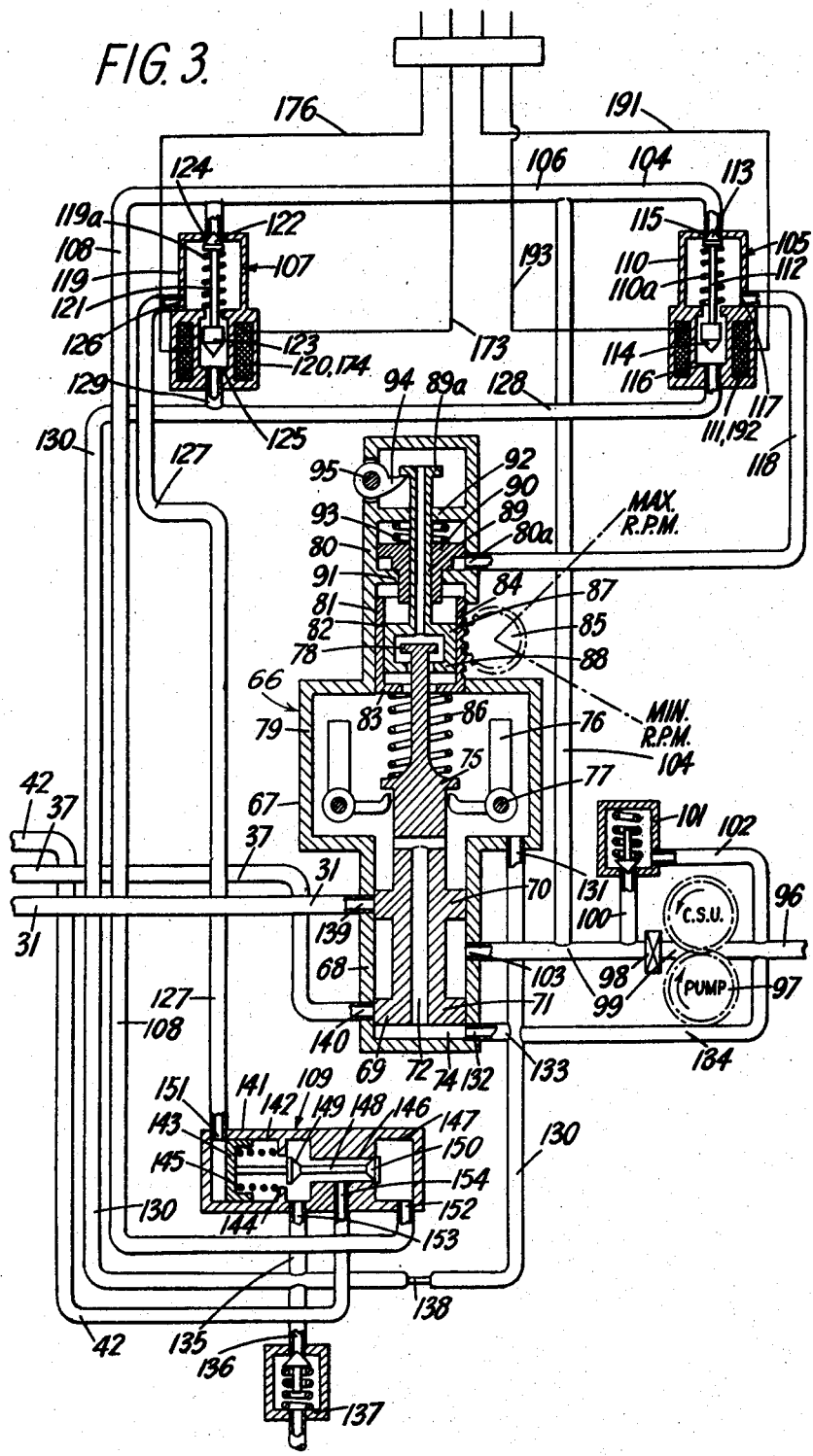

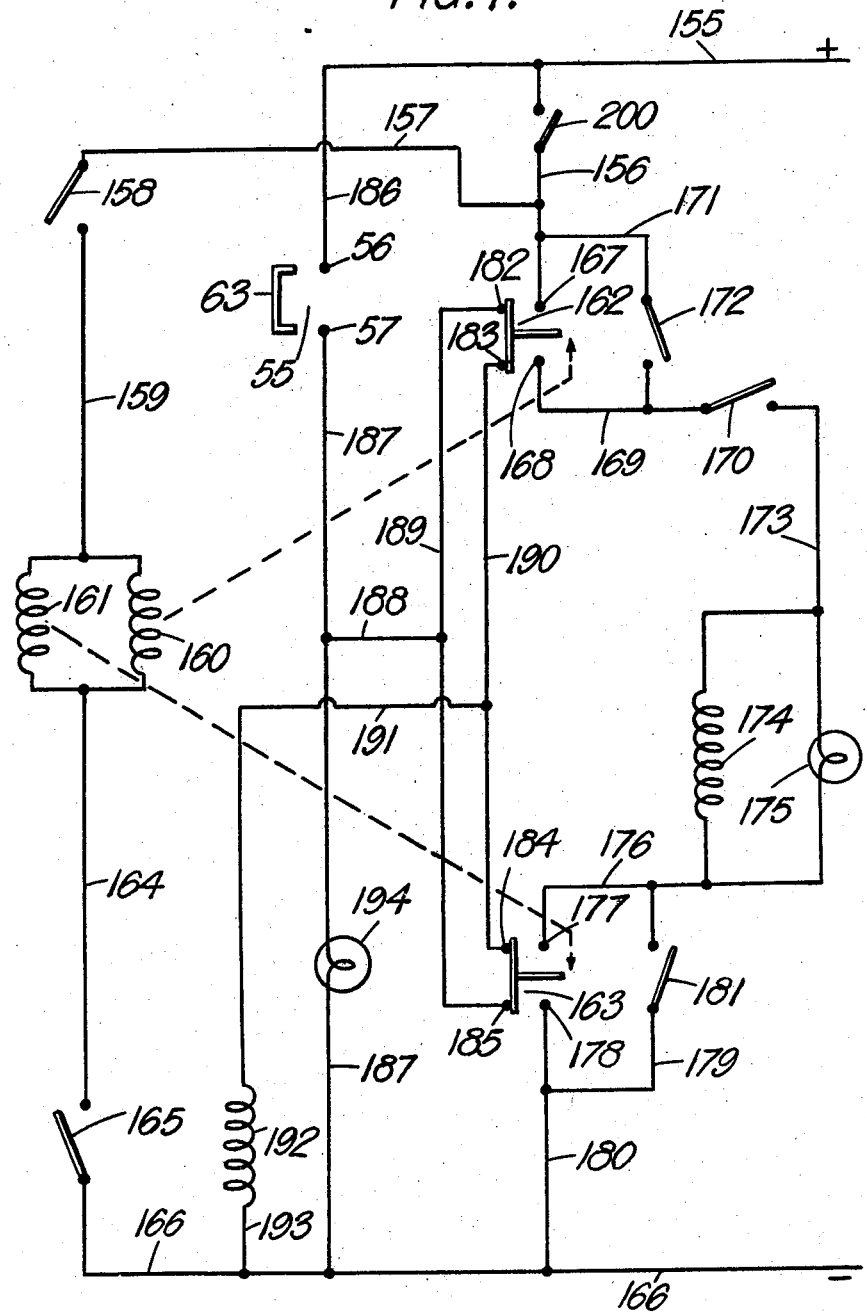

2,944,769

VARIABLE PITCH AIRSCREWS

Thomas Edward Godden and Edward Hollingworth Morris, Gloucester, England, assignors to Rotol Limited, Gloucester, England, a British company Filed Jan. 3, 1955, Ser. No. 479,576

Claims priority, application Great Britain Dec. 30, 1954

7 Claims. (Cl. 244—81)

This invention concerns hydraulic variable pitch propellers for aircraft of the kind in which movement of the blades of the propeller in the fine pitch direction is normally limited by a mechanical fine pitch stop which is retractable by hydraulic means.

Such a stop comes into action to prevent undesired fining off of the pitch of a propeller controlled by a constant speed device when the engine of an aircraft is throttled back prior to touch down on landing. Should some fault have occurred in the hydraulic system or in the mechanism of the stop itself, causing the stop not to be operative in the conditions referred to above, the excessive fining off of the pitch will cause an unexpected increase in drag and may cause the aircraft to crash, or at least to make a heavy landing.

Duplication of the fine pitch stop and all its control system as a means of safeguarding against this danger is impracticable on the ground of complication and the object of this invention is to provide a simple alternative arrangement which will be applicable both to that kind of hydraulic variable pitch propeller in which the fine pitch stop mechanism is retracted by a temporary increase in the pressure of fluid supplied to the propeller to operate its hydraulic servo system in pitch-fining sense and also to that kind of propeller in which the fine pitch stop mechanism is conditioned for retraction by a supply of fluid separate from that acting in the servo system.

According to the invention a hydraulic variable pitch propeller comprising a fine pitch stop and hydraulically operable means for retracting said stop is provided with coarsening initiating means to initiate coarsening of the pitch of the propeller which coarsening initiating means is operated by means detecting conditions under which said stop should be in its operative position when such conditions exist and by the propeller on reaching a pitch setting which is a predetermined amount finer than that corresponding to the limit set by said stop, the propeller and the detecting means acting together to operate the coarsening initiating means.

According to a feature of the invention, said pitch coarsening initiating means act to produce a temporary pitch-coarsening impulse in the hydraulic pitch-change mechanism of the propeller each time the pitch decreases to said finer setting, so that the average pitch setting is coarser than said finer setting and preferably approximates to the pitch setting as determined by normal operation of said fine pitch stop.

According to a further feature of the invention said means initiating coarsening of the pitch of the propeller do so by causing the temporary displacement of a valve controlling the supply of hydraulic fluid to the pitch-change mechanism of the propeller into a position allowing a substantial flow of fluid to take place in the sense to cause coarsening of the pitch of the propeller.

According to yet another feature of the invention said means initiating coarsening of the pitch include one or more electric switches operative by means detecting conditions under which the fine pitch stop should be in its operative position one or more electric switches arranged to be operated by the propeller on reaching said finer pitch setting, and electrically controllable means in circuit with said switches for effecting temporary displacement in the pitch-coarsening sense of a valve controlling the supply of hydraulic fluid to the pitch-change mechanism of the propeller.

A common requirement is that the fine pitch stop should normally be retractable only while the aircraft is not airborne, and in this case, according to a feature of the invention said coarsening initiating means may include one or more electric switches operated by relative movement of undercarriage parts of the aircraft so as to render said coarsening initiating means inoperative as the undercarriage deflects under the weight of the aircraft.

The invention also includes a particular construction of propeller comprising a double-acting hydraulic pitch change motor, a reciprocable valve to control the admission of fluid under pressure alternatively to the pitch coarsening or the pitch-fining sides of said motor, a fine pitch stop maintained in operative position by a spring acting in opposition to a piston loaded by pressure fluid in communication with the pitch fining side of said motor, pressure relief means arranged to prevent rise of said pitch fining pressure to a value sufficient to overcome said spring, means for loading said pressure relief means to allow said pitch fining pressure to rise to a value sufficient to overcome said spring, an electrical switch operated by displacement of the propeller pitch-change mechanism in the pitch fining direction beyond said fine pitch stop, an electrical switch operated by means detecting when said fine pitch stop should be in its operative position and electrical means controlled by the combined operation of said switches to cause or initiate an impulse upon said reciprocable valve in the sense to increase the admission of fluid to the pitch coarsening side of said motor.

The invention also includes a further particular construction of propeller comprising a double-acting hydraulic pitch change motor, a reciprocable valve to control the admission of fluid alternatively to the pitch coarsening or the pitch fining sides of said motor, a fine pitch stop maintained in operative position by a spring acting in opposition to a piston, means for supplying fluid under pressure through a supply line separate from the supply lines which supply fluid to and from the motor, to release said fine pitch stop for retraction, an electrical switch operated by displacement of the propeller pitch-change mechanism in the pitch fining direction beyond said fine pitch stop, an electrical switch operated by means detecting when said fine pitch stop should be in its operative position and electrical means controlled by the combined operation of said switches to cause or initiate an impulse upon said reciprocable valve in the sense to increase the admission of fluid to the pitch coarsening side of said motor.

Preferably, in a propeller as defined in the last preceding paragraph the means for supplying fluid to act upon said piston comprises a conduit separate from conduits through which fluid flows to the pitch-coarsening and the pitch-fining sides of the pitch-change motor, a fluid-pressure operated valve in said separate conduit, and an electrically operated valve to control the supply of operating fluid pressure to said fluid-pressure operated valve.

The invention will now be further described by way of example with reference to the propeller shown in the accompanying drawings, this propeller having a construction of the kind referred to in the last preceding paragraph.

In the drawings:

Figure 3 shows the relevant parts of the hydraulic circuit associated with the propeller, and Figure 4 shows the relevant parts of the electrical circuits associated with the propeller and the undercarriage of an aircraft in which the propeller is mounted.

Figure 1:
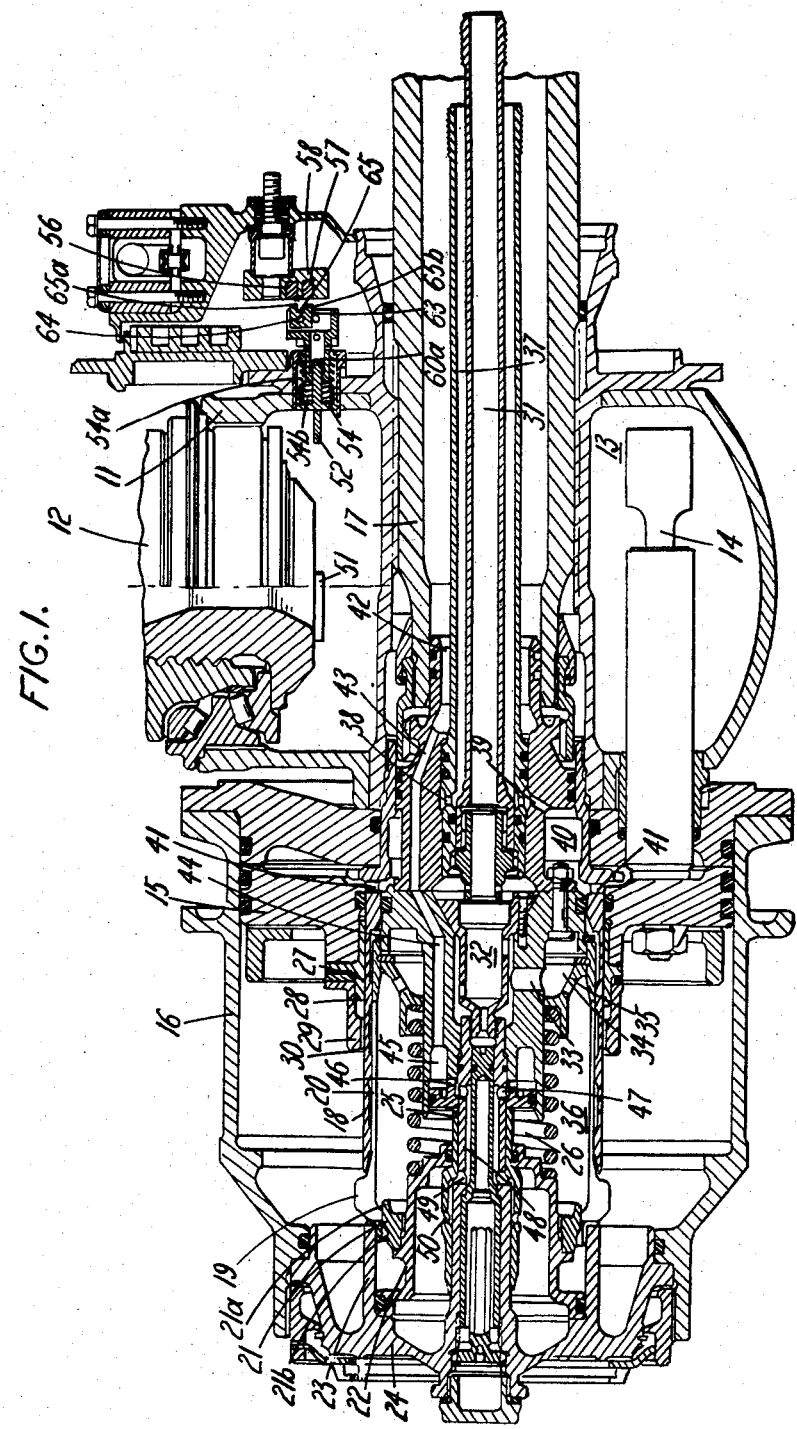
Figure 1 illustrates the hub construction of the propeller.

Referring to Figure 1 the propeller comprises a hub 11 upon which are journalled a number of blades, of which the root 12 of one only is shown, for rotation about their longitudinal pitch change axes. Each blade root 12 is provided with a crank pin, the axis of one of which is shown at 13, coupled by a connecting rod 14 to a ram 15 slidable in a cylinder 16 arranged coaxially with a driving shaft 17 on the nose portion of the hub 11. The ram 15 and cylinder 16 form two elements of a pitch change motor relative movement between which brings about pitch change adjustment of the propeller. The ram is of annular form and is slidable upon a stationary barrel 18 which houses retractable fine pitch stop mechanism. The fine pitch stops are in the form of abutments 19 which are mounted on resilient fingers 20. Inward movement of the abutment 19 is controlled by a retaining ring 21, having two diameters 21a and 21b on a stepped annular stop-release piston 22 sliding within a second barrel 23 forward of the abutments 19 and coaxial with the barrel 18, which barrel 23 is integral with, and closed at its forward end by, the nose cap 24 of the cylinder 16. The piston 22 is also slidable upon a central cylindrical part 25 and is normally held at the forward end of its stroke by a coil spring 26 and is movable rearwardly against the pressure of this spring under a sufficiently elevated differential pressure applied thereto as will be described hereinafter, thereby to bring the smaller diameter part 21b of the retaining ring 21 under the abutments 19 so that these latter can move inwardly to permit further forward movement of the ram 15. The ram is provided with a sleeve 27 which is a sliding fit on the barrel 18, its forward end being provided with a chamfered abutment 28. Projecting forward from this sleeve 27 is an annular ring 29 the forward end of which is also provided with a chamfered abutment 30. The internal diameter of this ring is such that the chamfered abutment 30 will engage the abutments 19 when these are held in their outer positions by the surface 21a of the retaining ring 21 but will slide over these abutments when the piston 22 is moved rearwardly to bring the surface 21b under the abutments. Forward movement of the ram 15 is then limited by the abutment 28 engaging the abutments 19 which are moved forward to abut on the rearward face of the barrel 23.

A channel 31 concentric with the driving shaft 17 passes through the centre thereof into the propeller hub. This channel is used to convey coarse pitch pressure fluid to the forward side of the ram 15 of the pitch change motor via a chamber 32, ports 33, chamber 34, ports 35, annular chamber 36 surrounding the central cylindrical part 25 and through the clearance between the individual abutments 19 to move the ram 15 in the pitch-coarsening direction.

Surrounding channel 31 is an annular channel 37 which is used to convey fine pitch pressure fluid to the rearward side of the ram 15 via ports 38, channel 39, annular chamber 40 and ports 41 to move the ram in the pitch-fining direction.

A third channel 42, hereinafter referred to as the "third oilway" surrounds channel 37 and is used to convey hydraulic fluid from a source which will be later described, via channels 43 and 44, annular chamber 45, ports 46 and 47, annular chamber 48, ports 49 and 50 to the forward side of the annular stop-release piston 22.

Mounted at the root end of each blade as shown is a cam 51 which, when the propeller blades move to a predetermined angle e.g. two degrees below the fine pitch stop position, in which abutments 19 and 30 are in engagement, engages a lever 52 pivoted at 53 to the hub 11. An abutment 52a on the lever bears against the plunger 54 of an electrical switch arrangement shown generally at 55 (comprising a propeller switch means) which cooperates with a pair of coaxial electrical slip rings 56 and 57 mounted in a ring 58 of suitable material which electrically insulates them from one another and which is supported on the forward end of the engine adjacent the propeller. Both slip rings and insulating ring are coaxial with respect to the driving shaft 17. The plunger 54 which is housed in a bore 59 is provided with a stem 60 which extends into the bore 61 of a sliding member 62 which carries a brush 63. This brush is pivotally mounted at the rearward extremity of this member by means of a pin 64, and is provided with a slot 65 so that the two projections 65a and 65b formed on either side thereof align with the slip rings 56 and 57. The bore 59 is reduced in diameter at 59a to form a shoulder between which and the underside of the plunger 54 a coil spring 54a is interposed. A second but weaker coil spring 54b is interposed between the underside of the plunger and a shoulder 62a on the sliding member 62. The bore of the sliding member at its forward extremity is reduced in diameter at 62b, the stem of the plunger being a sliding fit therethrough. The stem is provided at its rearward end with washers 60a conveniently secured thereto which are a sliding fit in the main bore 61 of the sliding member. It will be understood that the brush 65 is adequately insulated in any convenient manner from the sliding member.

Referring now to Figure 3 which is diagrammatical only, a constant speed unit generally indicated at 66 comprises a casing 67 which at its lower end 68 houses a valve 69 provided with lands 70 and 71 and a bore 72 leading from a chamber 74 below said valve into an annular space surrounding it above the land 70. The valve extends upwardly and is provided with a shoulder 75 against the underside of which bear the inner ends of governor flyweights 76 which are pivotally mounted at 77 in a manner not shown, such that they are rotatable by a drive from the engine (not shown). In a practical construction the flyweights are carried by the upper end of a ported sleeve interposed between the valve 69 and the casing 68, the sleeve being rotated by a drive shaft from the engine.

Above the shoulder 75, the valve 69 is reduced in diameter and at its upper end is provided with a further shoulder 78. The casing 67 is, in the vicinity of the flyweights 76, increased in size (79) but above the flyweights is reduced again at 80 to provide a bore 81 coaxial with the valve 69. This bore houses a sliding cylindrical member 82 provided with an inwardly directed shoulder 83 at its lower extremity and on one side with a gear rack 84. An aperture is provided in the vicinity of this rack in the wall of the casing 80 to permit a gear wheel 85 to mesh with said rack. Gear wheel 85 is mounted on a shaft (not shown) controlled by the pilot as hereinafter described. A coil spring 86 is interposed between the shoulders 75 and 83. Slidingly mounted in the bore of the cylindrical member 82 is a stepped cylindrical member 87, the lower extremity of which is provided with an inwardly directed shoulder 88. The arrangement is such that the upper end of the valve 69 is entered into said member 87 the shoulder 78 being disposed above the shoulder 88 and since shoulder 78 is larger in diameter than the hole surrounded by shoulder 88, the valve 69 and stepped cylindrical member 87 are coupled with a certain amount of lost linear motion between them. The stepped cylindrical member 87 is reduced in diameter at 89 and this part carries a stepped piston 90 secured thereto. On either side of this piston the walls of the casing 80 incorporate inwardly directed flanges 91 and 92 which form the ends of a cylinder in which the piston is operable against the pressure of a coil spring 93. The upper extremity of the member 87 is provided with a shoulder 89a against the underside of which a lever 94 pivoted at 95 to the casing 80, may engage. This lever is mechanically connected to the fuel isolating valve of the engine and acts as a two-position stop for the member 89 i.e. for the feathering and constant speeding positions of this member.

A conduit 96 for the passage of pressure fluid from the engine driving the propeller leads to the constant speed unit pump 97 which is driven by the engine through the same transmission (not shown) which drives the governor assembly. A non-return valve 98 is provided in the fluid delivery line 99 from the pump. A line 100 is taken from the line 99 downstream of the non-return valve to a pressure relief valve 101 which connects through the line 102 back to the conduit 96. Line 99 leads to a port 103 in the wall of the casing 68 communicating with the annular space between lands 70 and 71 of the valve 69. A line 104 is taken from line 99 to a solenoid valve unit 105 and a line 106 branches from line 104 to a solenoid valve unit 107. A further line 108 is taken from line 106 to a fluid pressure operated valve 109.

Solenoid valve unit 105 comprises a hollow casing 110 and the lower half of which is provided with an electrical solenoid 111. The valve member 112 is provided with upper and lower conical parts 113 and 114 at either end, the upper part closing onto a seating 115 when the valve is closed under pressure of a spring 110a and the lower part closing onto a seating 116 when it is opened under the action of the solenoid 111. Line 104 connects with the solenoid valve unit at seating 115. A port 117 in the wall of the upper part of the casing 110 opens into a line 118 which leads through a port 80a in the wall of the casing 80 through which fluid pressure may be applied to the underside of the stepped piston 90.

Solenoid valve unit 107 also comprises a hollow casing 119 the lower half of which is provided with an electrical solenoid 120. The valve member 121 is provided with upper and lower conical parts 122 and 123 at either end, the upper part closing onto a seating 124 when the valve is closed under pressure of a spring 119a and the lower part closing onto a seating 125 when it is open. Line 106 connects with the solenoid valve unit at seating 124. A port 126 in the side of the upper part of the casing 119 opens into a line 127 which leads to the valve 109. Lines 128 and 129 lead from the seatings 116 and 125 of solenoid valve units 105 and 107 respectively into a line 130 which leads through a port 131 in the casing 67 into the chamber surrounding the flyweights 76 of the governor. The chamber 74 below the valve 69 communicates through a port 132 and line 133 with the line 130. A further line 134 places line 130 in communication with the conduit 96 upstream of the pump 97. A line 135 is tapped from the line 130 and connects with the valve 109, while in the same vicinity a line 136 leads from line 130 to drain, a relief valve 137 being incorporated therein. A restriction 138 is provided in the line 130 as shown. Ports 139 and 140 are provided in the wall of the casing 68 which, when the constant speed unit is in the equilibrium position i.e. during constant speeding, are substantially closed by the lands 70 and 71 respectively. From port 139 a line 31 is taken as shown partly in Figure 1 to the propeller hub, while from port 140 a line 37 is also taken to the propeller hub, lines 31 and 37 respectively constituting the coarse and fine pitch fluid delivery lines.

The valve 109, to which reference has been made, comprises a casing 141 having a bore the left-hand end 142 of which houses a piston 143. A radially inwardly directed shoulder 144 is provided within this bore to the right of the piston and interposed between them is a coil spring 145. To the right of bore 142 is a central bore 146 of reduced diameter which opens into a third bore 147 of increased diameter. Piston 143 is provided with a stem 148 extending to the right and incorporating conical parts 149 and 150, the maximum diameters of which are somewhat larger than the diameter of the central bore 146. Part 149 is arranged to seat against the left-hand end of bore 146 when the piston 143 is moved over to the right while part 150 is arranged to seat against the right-hand end of the bore 146 when the piston 143 is moved over to the left. A port 151 is provided in the casing 141 at its left-hand end to which the line 127 passes. A port 152 is provided at the right-hand end of the casing to which the line 108 passes. A port 153 in the wall of the casing at the right-hand end of bore 142 receives line 135, while a further port 154 is provided in the wall of the central part of the valve and from this port the line 42, i.e., the "third oilway" leads (as shown partly in Figure 1) to the propeller hub.

Referring now to Figure 4 the electrical system associated with the propeller system comprises an electrical source (not shown) from which current passes through a lead 155 to either one of two circuits, the first being operative when the aircraft is on the ground and the second when the aircraft is in flight.

Taking the first circuit, a lead 156 is tapped from lead 155 and from it a lead 157 is taken to a stop withdrawal switch 158 arranged to be closed by the port main undercarriage oleo when the aircraft is on the ground. A further lead 159 is taken to a pair of coils 160 and 161 arranged in parallel, which coils are respectively operably associated with double-acting relay switches 162 and 163. From the coils 160 and 161 a lead 164 is taken through a stop withdrawal switch 165 which is arranged to be closed by the starboard main undercarriage oleo when the aircraft is on the ground, to a lead 166 which connects with the negative side of the current source. Lead 156 is taken to a contact 167 and the relay switch 162 is arranged when the aircraft is on the ground and therefore the coil 160 is energised, to bridge this and a second contact 168. From contact 168 a lead 169 is taken to a switch 170 for each engine of the power plant, these switches being closed at engine throttle settings at or near idling by suitable interconnection with the engine throttles (not shown). A lead 171 is taken from lead 156 and connects with lead 169 before the throttle switch 170. A switch 172 arranged to be closed by the undercarriage nose wheel oleo when the aircraft is on the ground, is included in lead 171. A lead 173 is taken from switch 170 to a coil 174 constituting the winding of the solenoid 120 of the solenoid valve unit 107 (see Fig. 3) this solenoid being capable of initiating operation of the "third oilway" pitch stop retraction system. A lamp 175 is provided in the circuit to indicate when the coil 174 is energised. From this coil a lead 176 is taken to a contact 177 and the relay switch 163 is arranged, when the aircraft is on the ground and therefore the coil 161 is energised, to bridge this and a second contact 178. A lead 179 is taken from lead 176 and connects into a lead 180 taken from contact 178. A switch 181 arranged to be closed by the undercarriage nose wheel oleo when the aircraft is on the ground, is included in lead 179. The switches 172 and 181 comprise stop withdrawal switch means. Lead 180 is taken to lead 166 which connects with the negative side of the current source. A switch 200 in the lead 156 permits these circuits to be opened in case of emergency.

The leads 156, 171, 173, 179 and 180 comprise a first line across the source of electric power 155, 166 and connects said source with the electromagnetic stop withdrawal means 174 through the stop withdrawal switch means 172, 181.

Figure 2:
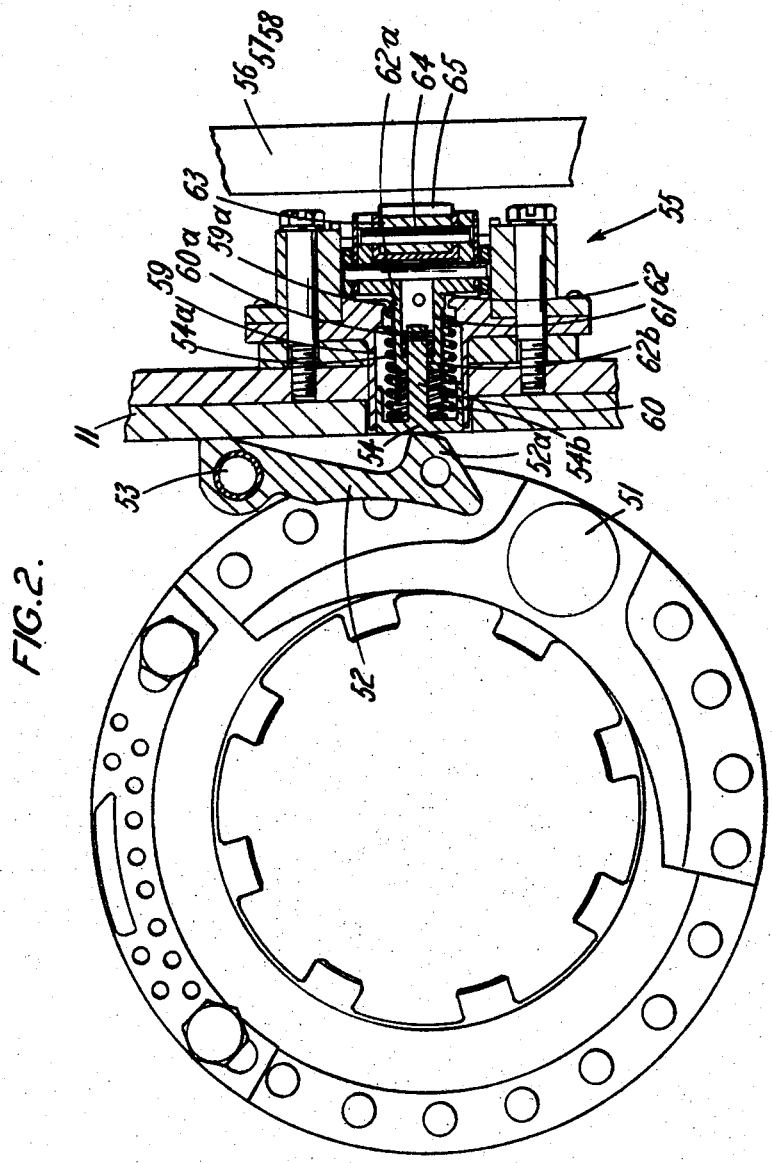
Figure 2 is a section along line 2—2 in Figure 1.

Taking now the second circuit, it will be understood that when the aircraft is in flight switches 158 and 165 will be open so that coils 160 and 161 will not be energised, and thus the relay switches 162, 163 will not bridge contacts 167, 168 and 177, 178 respectively. Instead they will bridge contacts 182, 183 and 184, 185 respectively. Nose wheel oleo switches 172 and 181 will also of course be open. A lead 186 is taken from lead 155 to one of the slip rings 56 (see also Fig. 1) shown diagrammatically as a contact in Figure 3. The second slip ring 57 is also shown as a contact and the brush 63 as a bridge. This forms the switch shown generally as 55 in Fig. 1. From slip ring 57 a lead 187 is taken to the lead 166 which connects with the negative side of the current source. A lead 188 is taken to lead 189 which connects contacts 182 and 185, while a lead 190 connects contacts 183 and 184. A lead 191 is taken from lead 190 to a coil 192 which constitutes the winding 111 of the solenoid valve unit 105 (see Fig. 2) the solenoid being capable of initiating lifting of the constant speed unit valve 69 to effect coarsening of the pitch of the propeller blades. A lead 193 is taken from this coil to the lead 166. The coil 192, the solenoid valve unit 105, the line 118, the reduced portion 80 and the port 80a of the casing 67 comprise electromagnetic overriding pitch coarsening means. A warning lamp 194 is included in lead 187 to indicate when the switch 55 is closed.

The leads 186 through 191 and 193 comprise a second line across the source of electric power 155, 166 and connects said source with the electromagnetic overriding pitch coarsening means 192 through the propeller switch means 55.

The hydraulic and electric circuits hereinbefore described may also include feathering and de-icing circuits, engine-failure responsive means, safety valves and switches, and the like according to particular requirements, but these are not shown in order to simplify the description of the system.

The operation of the complete system will now be described with reference to Figs. 1, 2, 3 and 4.

Under normal operating conditions pressure fluid from the oil system of the engine driving the propeller is delivered through conduit 96 to the constant speed unit pump 97 and high pressure fluid therefrom is delivered through the hydraulic line 99 and port 103 to the annular space between the lands 70 and 71 of the constant speed unit valve 69. Under constant speeding conditions the valve is held in its equilibrium position so that ports 139 and 140 are substantially closed by the lands and thus only sufficient fluid pressure is delivered to the pitch changing motor ram 15 to balance the centrifugal and aerodynamic moments on the blades. Should however the engine r.p.m. change, for example due to a change of aircraft trim or throttle opening, the governor flyweights 76 will move inwardly or outwardly about their pivots 77 under the effect of centrifugal force, either lifting the valve 69 against the coil spring 86 to effect coarsening of the blades, fluid pressure passing through port 139, line 31, chamber 32, ports 33, annular chamber 34, ports 35, annular chamber 36 to the forward side of ram 15 to effect coarsening of the propeller blades, or allowing it to move downwardly, fluid pressure passing through port 140, line 37 ports 38 and 39, annular chamber 40 and ports 41 to the rearward side of ram 15 to effect fining of the propeller blades. The speed setting of the propeller is varied by adjustment of the gear 85 and sliding cylindrical member 82 which adjusts the loading of the coil spring 86.

High fluid pressure is conveyed through line 104 to the solenoid valve unit 105, through line 106 to the solenoid valve unit 107 and through line 108 to the valve 109, but no action occurs since the respective valves 113, 122 and 150 are closed.

When it is desired to override the constant speed unit to coarsen the propeller for purposes such as will be described hereinafter, the solenoid 111 is energised and valve 112, which is normally maintained so that conical part 113 is closed on to seating 115, will then be moved so that conical part 114 closes onto seating 116, seating 113 being opened and permitting high pressure fluid in line 104 to pass into the unit 105 and out through line 118 to the underside of the stepped piston 90. The piston therefore compresses coil spring 93 and moves upwardly together with the stepped cylindrical member 87 to which it is secured, taking up the lost motion between the member 87 and the stem of the valve member 69. Shoulder 88 then abuts against shoulder 78 and the valve 69 is consequently lifted against the effort of coil spring 86. Thus land 70 uncovers port 139 and the coarse pitch pressure line 31 is opened to the annular chamber between lands 70 and 71, high pressure fluid passing therefrom to the forward side of the ram 15 to move the propeller blades towards coarse pitch.

When it is desired to adjust the pitch of the propeller to a fine pitch setting beyond the fine pitch stops 19 an engine speed is selected which causes the propeller to fine off until the chamfer 30 on the ring 29 is hard up against the fine pitch stop abutments 19. In order to retract the fine pitch stops the "third oilway" system is brought into operation by energising the solenoid 120 of the solenoid valve unit 107 valve 121 of which is normally maintained so that conical part 122 is closed onto seating 124. When solenoid 120 is energised the valve 121 is moved so that conical part 123 closes onto seating 125. Thus seating 124 is opened and permits high pressure fluid in line 106 to pass into the unit 107 and out through line 127 to the left-hand side of the piston 143 in valve 109. The high pressure fluid on the left-hand side of piston 143 overcomes the effort of coil spring 145 and the conical part 149 on the stem 148 seats against the left-hand end of the bore 146 while the conical part 150, which normally seats against the right-hand end of this bore, moves away from its seating, thereby permitting high pressure fluid supplied to chamber 147 through line 108 to pass into bore 146 and out through port 154 into the "third oil line" 42, through passages 43 and 44, annulus 45, ports 46 and 47, annulus 48 and ports 49 to the forward side of the stop release piston 22. The stop release piston is not moved however until after the ram has come up against the fine pitch stops. When this happens the pressure builds up on the forward side of the stop-release piston 22, and the lower fluid pressure on its opposite side, and the effort of the coil spring 26 are overcome so that the resultant pressure differential causes the piston 22, together with retaining ring 21, to move to the right. The abutments 19 therefore spring from the larger diameter 21a to the smaller diameter 21b of the retaining ring 21, by virtue of the resilient fingers 20 and the pressure of the ram 15. Consequently the abutments 19 are retracted sufficiently to permit the annular ring 29 to pass over them. Thus the ram 15 and annular ring 29 are free to move forwardly until the sleeve 27 contacts the abutments 19. This position of the ram 15 corresponds to a superfine pitch to which the propeller is moved, for example, for the engine starting cycle to reduce the drag of the propeller and thereby enable faster cranking speeds and consequently better starting to be obtained.

Superfine pitch may also be used during landing, when the aircraft has touched down to produce aerodynamic braking by the blades.

Fluid pressure from the conduit 96 (i.e. engine oil pressure) passes through line 134, 133 chamber 74 and bore 72 into the governor flyweight chamber 79 of the constant speed unit and back through port 131 into line 130 and passes through restrictor 133 across which the pressure drops to a suitably low value determined by the relief valve 137. From this point it passes to lines 128 and 129 leading to the solenoid valve units 105 and 107 respectively. When these units are closed to high pressure fluid from the constant speed unit, this low pressure fluid communicates through valve seating 116 and port 117 in unit 105, and line 118 with the underside of the piston 90, and also through valve seating 125, port 126 and passage 127 with the left-hand side of piston 143 of the valve 109. Line 135 from line 130 conveys this low pressure fluid to the right-hand side of piston 143 and also through port 154 into the "third oil line" 42.

The system as so far described operates in known manner.

It is arranged that when the propeller blades 12 move for example two degrees below their normal fine pitch setting, the cam 15 secured to a propeller blade contacts the cam lever 52 associated with the electrical switch 55 and moves it about its pivot 53 so that the abutment 52a depresses the plunger 54 against the coil spring 54a, the plunger, coil spring 54b, sliding member 62 and brush 63 all moving to the right together until the brush contacts the slip rings 56 and 57. Further depression of the plunger is taken up by the coil spring 54b thereby applying further pressure on the brush and also permitting the cam to move over the cam lever. The cam 51, cam lever 52, brush 63 and slip rings 56 and 57 thus constitute means for detecting when the propeller has fined off to a predetermined pitch setting finer than that normally set by said fine pitch stop.

The system is such that when the aircraft is on the ground and superfine pitch is selected for starting or any other purpose the switch 55 is isolated so that it does not initiate coarsening of the propeller blades, the blades moving normally into superfine pitch. Should however the fine pitch stop abutments fail in their retracted position during flight any movement of the propeller blades more than two degrees below the normal fine pitch angle causes closing of the switch 55 and through the electrical circuit shown in Fig. 3 initiates, as hereinafter described temporary coarsening of the blades to prevent a high propeller drag from developing by the propeller constant-speeding down to super-fine pitch.

Assuming the aircraft has touched down on landing then the oleo switches 158, 165, 172 and 181 are closed. Assuming also that the engine throttle is closed or nearly closed i.e. at ground idling or flight idling position then the switch 170 is closed. Since switches 158 and 165 are closed the coils 160 and 161 are energised and the relay switches 162 and 163 bridge contacts 167, 168 and 177, 178 respectively. Thus the circuit including leads 155, 156, 169, 171, 173, coil 174 and leads 176, 179, 180 and 166 is completed and the indicator lamp 175 lights up. Consequently solenoid valve unit 107 is operated to convey high pressure fluid from line 106 through line 127 towards the valve 109. This high pressure fluid passes into the valve from line 127 through port 151 to the left-hand side of piston 143 thereby moving this piston to the right against the coil spring 145 whereupon the conical part 150 is unseated and conical part 149 seated so that the high pressure fluid in line 108 and bore 147 is permitted to pass into the "third oilway" 42 via port 154. This effects retraction of the abutments 19 as already described, because the propeller will have constant speed toward fine pitch and the ram will have been brought up against the fine pitch stops to allow sufficient pressure to build up in the third oilway to move the stop release piston 22.

In the flight setting position of throttle, the constant speed unit governor is set to select an r.p.m. greater than can be achieved by the engine with the fuel supply at the flight idling setting of the throttle. When throttled back therefore the constant speed unit selects "pitch fining" which brings the ram hard against the fine pitch stops so that a pressure differential is developed in the third oilway sufficient to break down the fine pitch stops.

It may happen however that the abutments 19 remain jammed in their retracted position due to seizure of the piston 22, fracture of the coil spring 26 or other failure. Such failure may occur just prior to flight when the aircraft is on the ground and if no safety arrangements were provided the propeller blades might move to a superfine pitch in flight e.g. when the engine is throttled back after take-off or before touch down (there is normally no danger of this occurring during take-off because the propeller is held well above fine pitch by the constant speed unit under these conditions). Such movement to superfine pitch would lead to an increase drag above that anticipated by the pilot, with possibly dangerous results.

Thus according to this invention as soon as the aircraft leaves the ground the oleo switches 158, 165, 172 and 181 are opened so that the coils 160 and 161 are de-energised. Consequently relay switches 162 and 163 move from contacts 167, 168 and 177, 178 to bridge contacts 182, 183 and 184, 185, thereby isolating the "on-ground" circuit and bringing the "flight" circuit into operation. The oleo switches 158 and 165 constitute a means for detecting flight conditions in which the abutments 19 limit the movement of the ram 15 in the pitch fining direction. This circuit includes the switch 55 and coil 192 for operating the solenoid valve unit 105. If during flight the abutments 19 remain in the retracted position and the ram 15 and propeller blades move below the fine pitch setting by for example two degrees, the switch 55 is automatically closed. This immediately completes the circuit formed by leads 155, 186, 187, 188, 189, 190, 191, 193 and 166 thereby energising coil 192 and also illuminating the lamp 194. Consequently the solenoid valve permits high pressure oil to pass through line 118 to the underside of piston 90 which lifts the constant speed unit valve 69. This, as previously described, permits high pressure fluid to pass to the forward side of the ram 15 to coarsen the pitch of the propeller blades. This coarsening is temporary since as soon as switch 55 is opened by movement of the blades the valve 69 is released. It will be understood that the above sequence will reoccur each time switch 55 is closed but the intermittent flashing of the lamp 194 will warn the pilot to adjust the setting of the throttle to obtain a coarser propeller pitch above the pitch at which the switch 55 closes, as a temporary measure, or to stop the engine and feather the propeller if it is safe to do so.

It will be understood that during a take-off run when the aircraft is on the ground with the engine throttle wide open, both "ground" and "flight" electrical circuits are inoperative, this also being so when the nose wheel leaves the ground. As soon as the main wheels leave the ground however, the "flight" circuit becomes operative irrespective of throttle setting.

If the fine pitch stop abutments fail in the retracted position prior to landing of the aircraft and if the blades move to a sufficiently fine pitch the switch 55 is closed and initiates temporary coarsening of the propeller blades to prevent high drag. As soon as the main wheels of the undercarriage touch down the oleo switches 158 and 165 are closed and operate relays 160 and 161 to bring the "ground" circuit into operation and isolate the "flight" circuit. Then, with the throttle set at idling r.p.m. or flight idling r.p.m., the blades can move into the superfine pitch position to produce aerodynamic braking. When the nose wheel touches down the switches 172 and 181 close, and in the event of either one of the relays 162 and 163 failing to operate to close the "ground" circuit contacts 167, 168 or 177, 178 permit energising of the coil 174.

Two main wheel oleo switches are provided since if one fails to open during take-off the other still isolates the "ground" circuit.

Two nose wheel oleo switches are provided since if one fails to close on landing the "flight" circuit is still isolated by the other providing both relays 162 and 163 operate normally.

The switches 182, 183, 162; 184, 185, 163 comprise primary or first detecting switch means operatively connected to the primary detecting means, comprising switches 158 and 165, for detecting conditions under which the pitch fining movement of the propeller should be limited by the stop means 19, 21, 22, the primary detecting switches 182, 183; 184, 185 being closed when the primary detecting means detects the said conditions.

The switches 162, 167, 168; 163, 177, 178 comprise second detecting switch means operatively connected to the primary detecting means, comprising switches 158 and 165, the second detecting switches 167, 168; 177, 178 being opened when said primary detecting means detects conditions under which the pitch fining movements of the propeller should be limited by the stop means 19, 21, 22 and closed when the primary detecting means detects other conditions.

We claim:

1. A variable pitch propeller for an aircraft comprising pitch fining means for fining the pitch of the propeller; pitch coarsening means for coarsening the pitch of the propeller; stop means limiting the fining movement of the propeller; electromagnetic stop withdrawal means connected to said stop means and operable to render the stop means inoperative; stop withdrawal switch means adapted to be closed when the undercarriage of the aircraft is on the ground; propeller switch means in effective operative connection during flight of the aircraft with said propeller to be closed by said propeller when it fines off to predetermined amount finer than that set by the stop means; electromagnetic overriding pitch coarsening means connected to said pitch coarsening means and operable to initiate pitch coarsening movement of said propeller; and an electric circuit comprising a source of electric power; a first line across said source and connecting said source with said electromagnetic stop withdrawal means through said stop withdrawal switch means; and a second line across said source and connecting said source with said electromagnetic overriding pitch coarsening means through said propeller switch means.

2. A variable pitch propeller for an aircraft comprising pitch fining means for fining the pitch of the propeller; pitch coarsening means for coarsening the pitch of the propeller; stop means limiting the fining movement of the propeller; electromagnetic stop withdrawal means connected to the stop means and operable to render the stop means inoperative; a double-acting switch arrangement comprising two switches connected so that when one is open the other is closed and vice versa, one of which is adapted to be closed when the undercarriage of the aircraft is on the ground; propeller switch means in effective operative connection during flight of the aircraft with said propeller to be closed by said propeller when it fines off to predetermined amount finer than that set by the stop means; electromagnetic overriding pitch coarsening means connected to said pitch coarsening means and operable to initiate pitch coarsening movement of said propeller; and an electric circuit comprising a source of electric power, a first line across said source and connecting said source with said electromagnetic stop withdrawal means through one of said two switches and a second line across said source and connecting said source with said electromagnetic overriding pitch coarsening means through said propeller switch means and the other of said two switches.

3. A variable pitch propeller for an aircraft comprising pitch fining means for fining the pitch of the propeller; pitch coarsening means for coarsening the pitch of the propeller; stop means limiting the fining movement of the propeller; electromagnetic stop withdrawal means connected to said stop means and operable to render the stop means inoperative; stop withdrawal switch means adapted to be closed when the undercarriage of the aircraft is on the ground; a double-acting switch arrangement comprising two switches connected so that when one is open the other is closed and vice versa; propeller switch means in effective operative connection during flight of the aircraft with said propeller to be closed by said propeller when it fines off to predetermined amount finer than that set by the stop means; electromagnetic overriding pitch coarsening means connected to said pitch coarsening means and operable to initiate pitch coarsening movement of said propeller; and an electric circuit comprising a source of electric power; a first line across said source and connecting said source with said electromagnetic stop withdrawal means through said stop withdrawal switch means and one of said two switches which latter is in parallel with said stop withdrawal switch means; and a second line across said source connecting said electromagnetic overriding means with said source through said propeller switch means and the other of said two switches.

4. A variable pitch propeller for an aircraft which propeller comprises pitch coarsening means for coarsening the propeller pitch, pitch fining means for fining off the propeller pitch; stop means for limiting the fining movement of the propeller; electromagnetic stop withdrawal means operatively connected to said stop means, and operable to render the latter inoperative; primary detecting means including a first detecting switch means adapted to be closed when the undercarriage of the aircraft is on the ground; for detecting conditions under which the pitch fining movement of the propeller should be limited by the stop means; said first detecting switch means being closed when said primary detecting means detects the said conditions; propeller detecting means operatively connected to the propeller to detect when the propeller has fined off further than the amount set by said stop means; propeller switch means during flight of the aircraft being effectively operatively connected to said propeller detecting means to be closed thereby when said propeller detecting means detects that the propeller has fined off further than the amount set by said stop means; electromagnetic overriding pitch coarsening means operatively connected to initiate coarsening movement of said propeller; an electric circuit comprising a source of electrical power; a first line across said source and incorporating in series said first detecting switch means and said electromagnetic stop withdrawal means whereby the latter is energized whenever said first detecting switch means is closed, a second line in parallel with said first line across said source and incorporating in series said propeller switch means and said electromagnetic overriding pitch coarsening means whereby the latter is energized whenever said propeller switch means is closed, and stop withdrawal signal means operatively connected in said first line in series with said first detecting switch means and in parallel with said electromagnetic stop withdrawal means to emit a signal when said stop withdrawal means is operative.

5. A variable pitch propeller for an aircraft which propeller comprises pitch coarsening means for coarsening the propeller pitch, pitch fining means for fining off the propeller pitch; stop means for limiting the fining movement of the propeller; electromagnetic stop withdrawal means operatively connected to said stop means, and operable to render the latter inoperative; primary detecting means including a first detecting switch means adapted to be closed when the undercarriage of the aircraft is on the ground for detecting conditions under which the pitch fining movement of the propeller should be limited by the stop means; said first detecting switch means being closed when said primary detecting means detects the said conditions; second detecting switch means operatively connected to said primary detecting means to be opened when said primary detecting means detects said conditions and closed when said primary detecting means detects conditions other than said conditions; propeller detecting means operatively connected to the propeller to detect when the propeller has fined off further than the amount set by the said stop means; propeller switch means during flight of the aircraft being effectively operatively connected to said propeller detecting means to be closed thereby when said propeller detecting means detects that the propeller has fined off further than the amount set by said stop means; electromagnetic overriding pitch coarsening means operatively connected to initiate coarsening movement of said propeller; and an electric circuit comprising a source of electrical power; a first line across said source and incorporating in series said first detecting switch means and said electromagnetic stop withdrawal means whereby the latter is energized whenever said first detecting switch means is closed; and a second line in parallel with said first line across said source and incorporating in series said propeller switch means, said second detecting switch means, and said electromagnetic overriding pitch coarsening means whereby the latter is energized whenever both said propeller switch means and said second detecting switch means are closed.

6. The variable pitch propeller of claim 5 further comprising a propeller switch signal means operatively connected in said second line in series with said propeller switch means and in parallel with said second detecting switch means and said overriding pitch coarsening means to emit a signal when said propeller switch is closed.

7. The combination with an aircraft having an undercarriage, of a variable pitch propeller, pitch coarsening means for coarsening the propeller pitch, pitch fining means for fining off the propeller pitch, stop means for limiting the fining movement of the propeller, electromagnetic stop withdrawal means operatively connected to said stop means and operable to render the latter inoperative, primary detecting means for detecting conditions under which the pitch fining movement of the propeller should be limited by the stop means including the undercarriage and first detecting switch means operatively connected to the undercarriage to be opened thereby, during flight only, when said primary detecting means detects said conditions, propeller detecting means operatively connected to the propeller to detect when the propeller has fined off further than the amount set by said stop means, propeller switch means operatively connected to said propeller detecting means to be closed thereby when said propeller detecting means detects that the propeller has fined off further than the amount set by said stop means, electromagnetic overriding pitch coarsening means operatively connected to the propeller pitch coarsening means to initiate coarsening movement of said propeller, said connection between the undercarriage and said first detecting switch means causing said first detecting switch means to close when the undercarriage contacts the ground, and an electric circuit comprising a source of electrical power, a first line across said source and connecting said electromagnetic stop withdrawal means to said source through said first detecting switch means when said first detecting switch means is closed to energize said electromagnetic stop withdrawal means, and a second line across said source connecting said source to said electromagnetic overriding pitch coarsening means through said propeller switch means to energize the said electromagnetic overriding pitch coarsening means when said propeller switch means is closed.

References Cited in the file of this patent

UNITED STATES PATENTS

| | | |
|---|---|---|
| 2,593,910 | Morris et al. | Apr. 22, 1952 |
| 2,600,017 | Morris et al. | June 10, 1952 |
| 2,652,122 | Longfellow | Sept. 15, 1953 |
| 2,655,999 | Basevi | Oct. 20, 1953 |
| 2,663,373 | Richmond | Dec. 22, 1953 |
| 2,699,304 | Treseder et al. | Jan. 11, 1955 |